United States Patent
Hwang et al.

(10) Patent No.: US 12,119,496 B2
(45) Date of Patent: Oct. 15, 2024

(54) COMPOSITE MODIFIED LAYER AND ANODE-FREE LITHIUM METAL BATTERY THEREOF

(71) Applicant: National Taiwan University of Science and Technology, Taipei (TW)

(72) Inventors: Bing-Joe Hwang, Taipei (TW); Wei-Nien Su, Taipei (TW); Shi-Kai Jiang, Taipei (TW); Chen-Jui Huang, Taipei (TW); Sheng-Chiang Yang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 113 days.

(21) Appl. No.: 17/386,124

(22) Filed: Jul. 27, 2021

(65) Prior Publication Data

US 2022/0077469 A1 Mar. 10, 2022

Related U.S. Application Data

(60) Provisional application No. 63/119,707, filed on Dec. 1, 2020, provisional application No. 63/075,216, filed on Sep. 7, 2020.

(51) Int. Cl.
*H01M 4/62* (2006.01)
*H01M 4/02* (2006.01)
(Continued)

(52) U.S. Cl.
CPC .......... *H01M 4/628* (2013.01); *H01M 4/366* (2013.01); *H01M 4/405* (2013.01); *H01M 4/661* (2013.01);
(Continued)

(58) Field of Classification Search
CPC ...... H01M 4/628; H01M 4/366; H01M 4/405; H01M 4/661; H01M 4/622; H01M 4/625;
(Continued)

(56) References Cited

U.S. PATENT DOCUMENTS

| 11,133,509 | B2 | 9/2021 | Guichard et al. |
| 2017/0214103 | A1* | 7/2017 | Onnerud ................ H01G 11/06 |

(Continued)

FOREIGN PATENT DOCUMENTS

| CN | 110690453 A | 1/2020 |
| CN | 110783517 A | 2/2020 |
| WO | WO-2018011576 A1 * | 1/2018 |

*Primary Examiner* — Christopher P Domone
*Assistant Examiner* — Kimberly Wyluda
(74) *Attorney, Agent, or Firm* — Best & Flanagan LLP

(57) ABSTRACT

Present invention is related to a composite modified layer attached on a current collector comprising a lithiophilic particle being covered or coated by a polymer layer. The composite modified layer could be coated with an additional carbon layer or artificial protective film as several suitable embodiments presented in this invention. The lithiophilic particle, such as sliver nano-particle, will firstly form a lithium-silver alloys to reduce a thermodynamic instability during the growth of lithium nuclei. The sliver nano-particle is able to be attached securely on the current collector by the polymer with high adhesion ability. The fuel cell including the composite modified layer in the present invention has higher average Coulombic efficiency and higher capacity retention.

4 Claims, 8 Drawing Sheets

(51) Int. Cl.
  *H01M 4/36* (2006.01)
  *H01M 4/40* (2006.01)
  *H01M 4/66* (2006.01)
  *H01M 10/052* (2010.01)

(52) U.S. Cl.
  CPC .... *H01M 10/052* (2013.01); *H01M 2004/027* (2013.01); *H01M 4/622* (2013.01); *H01M 4/625* (2013.01); *H01M 4/663* (2013.01); *H01M 4/667* (2013.01); *H01M 4/668* (2013.01)

(58) Field of Classification Search
  CPC ...... H01M 4/667; H01M 4/663; H01M 4/668; H01M 10/052; H01M 2004/027
  See application file for complete search history.

(56) References Cited

U.S. PATENT DOCUMENTS

| | | | |
|---|---|---|---|
| 2018/0069234 A1* | 3/2018 | Friend | H01M 4/625 |
| 2018/0123114 A1* | 5/2018 | Cho | H01M 4/1395 |
| 2019/0341601 A1* | 11/2019 | Park | H01M 4/661 |
| 2020/0035986 A1 | 1/2020 | Hoschen et al. | |
| 2020/0119337 A1* | 4/2020 | Jang | H01M 4/622 |
| 2021/0036328 A1* | 2/2021 | Ogata | H01M 10/0585 |

* cited by examiner

COMPOSITE MODIFIED LAYER AND ANODE-FREE LITHIUM METAL BATTERY THEREOF

FIELD OF INVENTION

The Present invention is related to a composite modified layer using lithiophilic nanoparticle with polymer, especially to a composite modified layer for lithium metal battery to avoid dendrite growth with higher average coulombic efficiency and higher capacity retention.

The present invention has been developed primarily to be a composite modified layer on a anode-free lithium metal battery for describing hereinafter with references and multiple embodiments to this application. However, it will be appreciated that the present invention is not limited to this particular method, field of use or effect.

BACKGROUND OF THE INVENTION

Lithium metal battery is a promising high-energy-density energy storage system taken on the credit to its low reduction potential, low density and high-energy-density abilities which has drawn more and more attention to the filed nowadays. However, lithium metal battery is still not commercially available or commonly used on the market due to the low cycle efficiency, uncontrollable dendrite growth during the cycle life time. Especially to the anode-free lithium metal battery, the growth of the lithium nuclei and dendrite on its current collector cause thermally unstable and rapidly failure to the battery within just few cycles. Hence, it is eager to have a solution that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

In order to solve shortcomings of the growth of the lithium nuclei and dendrite on the conventional current collector causing thermally unstable and rapidly failure to the full lithium metal battery, the present invention is required. In the first aspect of the present invention, a composite modified layer is attached to a surface of a current collector comprising: a lithiophilic nano-particle and a polymer forming as a polymer composite; and the surface of the current collector comprises at least a metal.

In accordance with the second aspect of the present invention, wherein: the composite modified layer is further attached with a carbon containing layer onto the surface of the polymer composite.

In accordance with the third aspect of the present invention, wherein: the composite modified layer is further attached with an artificial protective layer onto the surface of the polymer composite; and the artificial protective layer is a mixture or a composite of Polyvinylidene fluoride-hexafluoropropylene copolymer with lithium bis(trifluoromethanesulfonyl)imide.

In accordance, the present invention has the following advantages:

In the present invention, the composite modified layer was firstly coated or attached on the current collector at anode of the full lithium metal battery with a lithiophilic nano-particle and a polymer forming as a polymer composite, such as Ag@PDA in the first embodiment as described hereinafter. By using the lithiophilic nano particle, the lithium ion will firstly form an alloy with the silver nano-particles to decrease the thermal unitability during the growth of lithium nuclei crystal and also inhabit the formation of dendrite. The silver nano-particles are securely attached on the current collector by the polymer with its high mechanical adhesion properties.

Other preferred embodiment provided by the present invention is an artificial protective layer coating or attaching on the Ag@PDA composite layer. By combining both inorganic, organic material with consideration of its lithiophilic ability, physical and chemical characteristics of electrolyte, the artificial protective layer could also solve the problem of uncontrollable growth of dendrite during charging or discharging cycles for the full cell.

The composite modified layer provided by the present invention has high lithium ion conductivity, low electron conductivity and high stability of electrolyte and overall mechanical strength which is suitable for using in lithium metal battery, especially for anode-free lithium metal battery. The composite modified layer can also be used in liquid or solid state electrolyte for providing better and safer charging and discharging performance during life cycles for the full cell.

Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
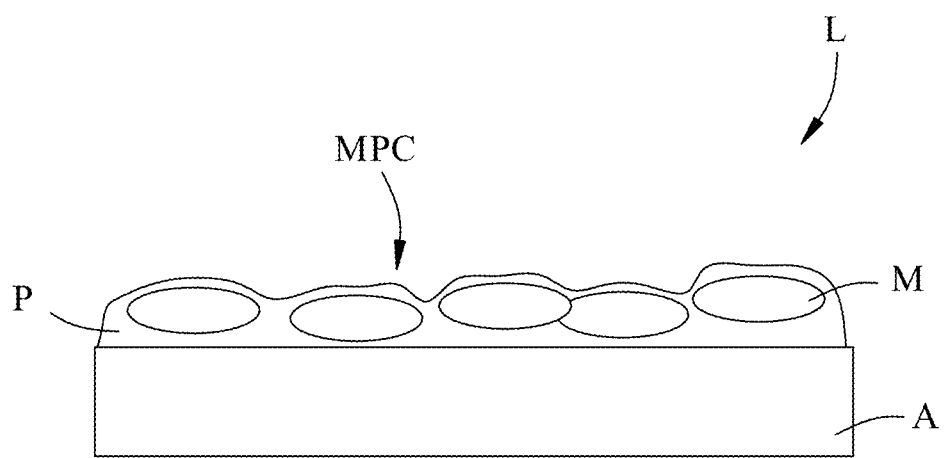
FIG. 1 is an illustration of a first embodiment of the composite modified layer in accordance with the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

Embodiment 1

With reference to FIG. 1, a first embodiment of the composite modified layer L is presented comprising a lithiophilic nano-particle M and a polymer P forming as a polymer composite MPC. The polymer composite MPC is attached on a surface of a current collector A.

In this preferred embodiment, the lithiophilic nano-particle M comprises one or a combination of a nano-particle of Gold (Au), Platinum (Pt), Palladium (Pd), Silicon (Si), Silver (Ag), Aluminum (Al), Bismuth (Bi), Tin (Sn), Zinc (Zn) or Indium (In). The polymer M comprises one or combination of Polydopamine, Polyvinyl alcohol (PVA), Poly(vinyl alcohol-co-ethylene) (EVOH), Poly(sodium 4-styrene sulfonate), poly(2-acrylamido-2-methyl-1-propanesulfonic acid) (PolyAMPS), Polyacrylic acid (PAA), Poly(sodium acrylate), Polyacrylonitrile (PAN), Styrene Butadiene Rubber (SBR) or Carboxymethyl Cellulose (CMC). The surface of the current collector A comprises one or a combination of Copper (Cu), Silver (Ag), Nickel (Ni), Platinum (Pt), Gold (Au) or stainless steel.

In this embodiment, the lithiophilic nano-particle M will be chosen as sliver nano-particle with the polymer M as Polydopamine to form the sliver nano-particle@polydopamine composite (AgNPs@P) to be attached on the surface of a copper foil as the surface of the current collector in an anode-free lithium battery.

A preparation of the AgNPs@P composite comprises steps as following: 10 mg of dopamine was added into 20 ml of Tris-HCl buffer solution (10 mM, pH=8.5) and mixed with 20 colloidal solution containing silver nano-particles and mixing thoroughly using magnetic stirrer for 12 hours. The AgNPs@P composite will be obtained by centrifugation at 12000 RMP and washed with ethanol and deionized water for three times. Further, the AgNPs@P composite is attached on the surface of the current collector A by coating method.

Embodiment 2

Figure 2:
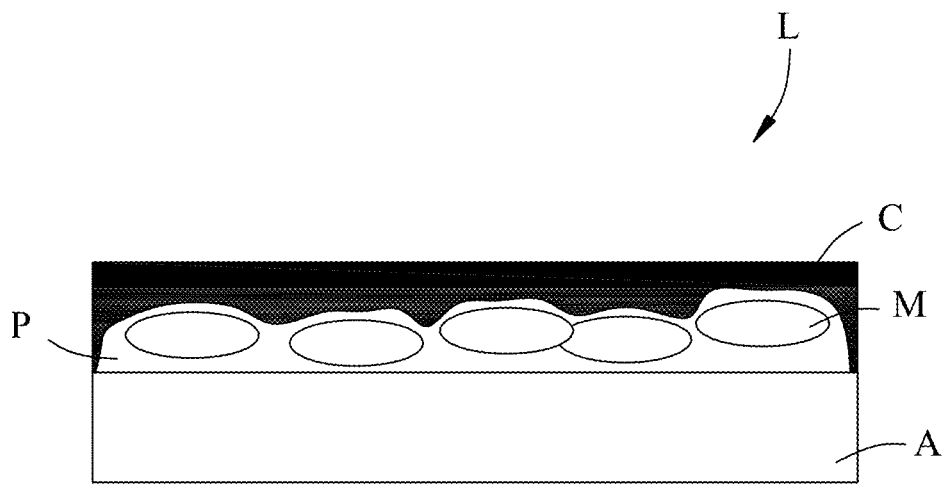
FIG. 2 is an illustration of a second embodiment of the composite modified layer in accordance with the present invention.

With reference to FIG. 2, a second preferred embodiment of the composite modified layer L are presented with further attached a carbon containing layer C onto the surface of the polymer composite MPC disclosed in the first embodiment. In this preferred embodiment, the carbon containing layer C comprises one or combination of Graphene oxide (GO), graphene, carbon tube, soft carbon, hard carbon, natural graphite or artificial graphite. The carbon containing layer C performs as an artificial solid electrolyte interface (ASEI) to buffer a distribution of the lithium ions in the anode-free lithium battery.

Embodiment 3

Figure 3:
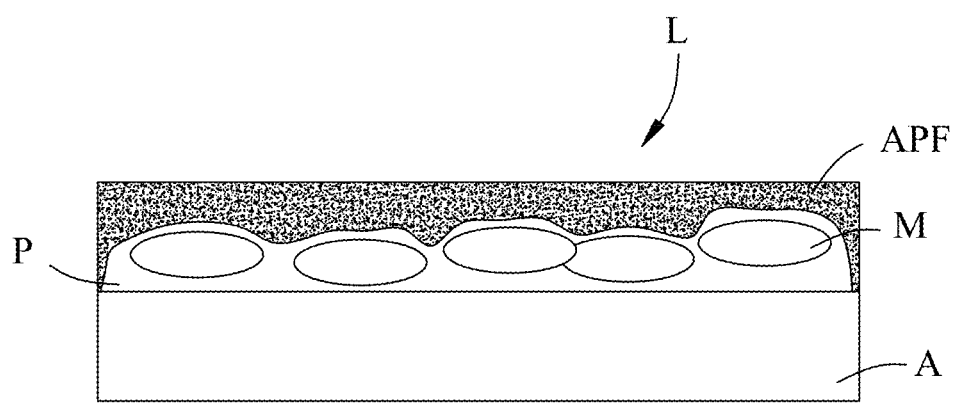
FIG. 3 is an illustration of a third embodiment of the composite modified layer in accordance with the present invention.

With reference to FIG. 3, a third embodiment of the composite modified layer L are presented with further attached an artificial protective layer (APF) onto the surface of the polymer composite MPC disclosed in the first embodiment. The APF in this embodiment is preferred to be a mixture or a composite of Polyvinylidene fluoride-hexafluoropropylene copolymer (PVDF-HFP) with lithium bis(trifluoromethanesulfonyl)imide (LiTFSI) with mass ratio at a range from 5:1 to 5:3. The mixture or the composite of PVDF-HFP and LiTFSi is prepared by adding PVDF-HFP and LiTFSi into 1-methyl-2-pyrrolidone (NMP) and stirred with a magnetic stirrer for 12 hours to obtain a solution. Further, coating the solution on the surface of the composite modified layer L as described in the first embodiment.

The following are some validation tests for the composite modified layer L provided by the present invention in a form of full lithium metal batteries such as Cu|Ag@PDA//Li or Cu|Ag@PDANNMC.

Figure 4:
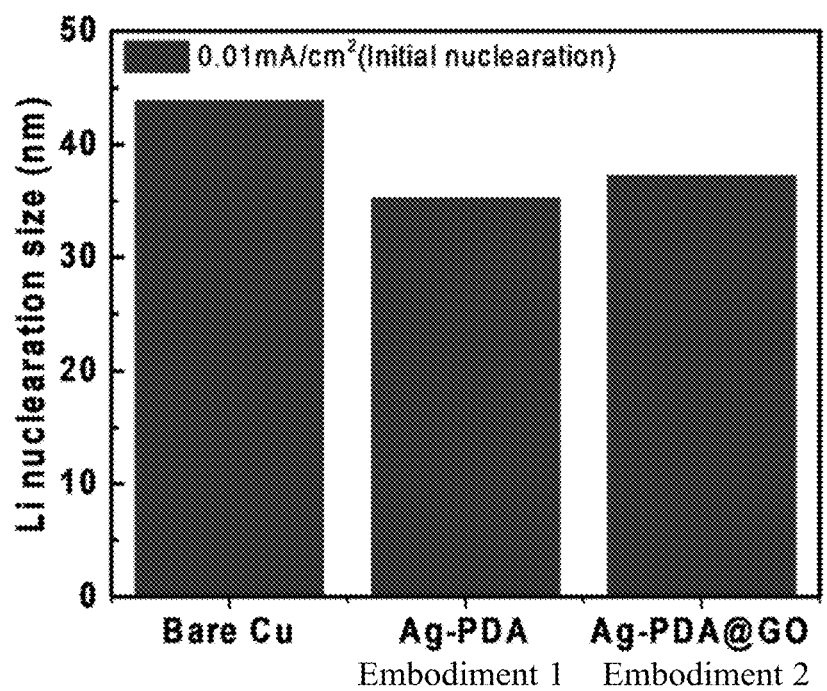
FIG. 4 is a validation result of measuring a nuclei size of lithium crystal particle using small angle X-ray scattering (SAXS) with current density 0.01 mA/cm2 for the embodiments 1-3 in accordance with the present invention.

With reference to FIG. 4, it is a result of measuring a nuclei size of lithium crystal particle using small angle X-ray scattering (SAXS) with current density 0.01 mA/cm$^2$. In FIG. 4, the initial size of the lithium crystal particle of each sample started at 0.01 mA/cm$^2$. After few cycles for the battery, the first and the second embodiment as mentioned above are presented with growth of nuclei size of lithium crystal particle in 35 nm and 37 nm. The control group (or compared group) which the current collector is only bare copper foil, the nuclei size of lithium crystal particle of the control group is 44 nm with larger size compared to the present invention. The smaller size of the nuclei size of lithium crystal particle means less chance of growth of dendrite on the lithium battery. It is worth to be noticed that the size of the silver particle in the composite modified layer L is around 50 nm which made the whole composite modified layer L including the polymer P become to around 1 micron (micro-). The preferred thickness of the composite modified layer L of the present invention is better to be control at a range of 1-50 μm, which the thinner it is, the better performance it will be.

Figure 5A:
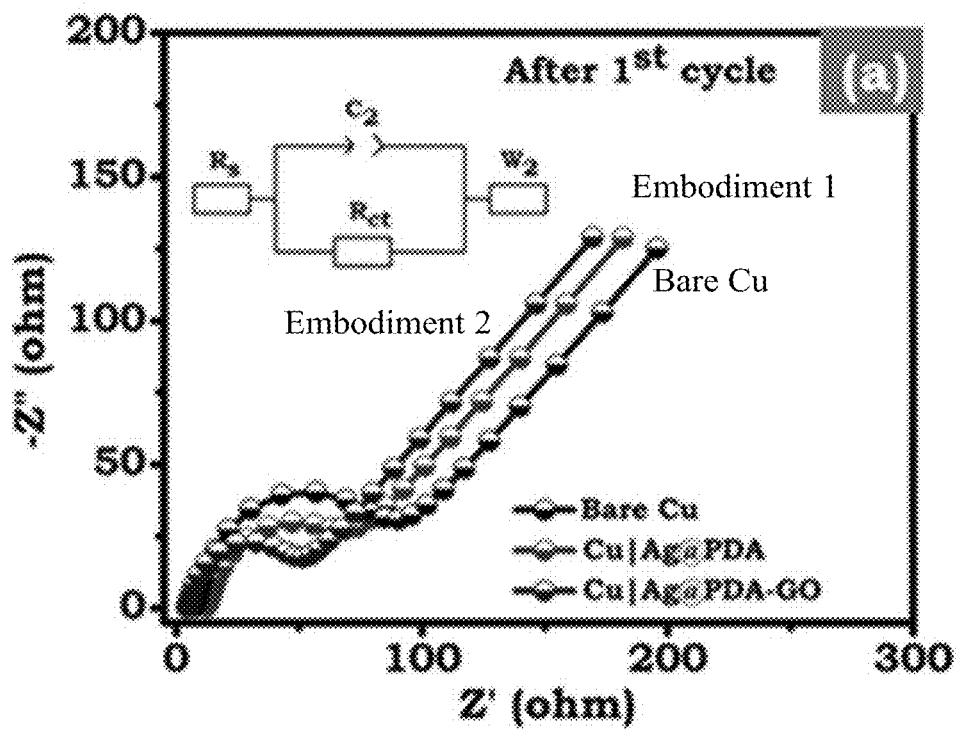
FIG. 5A is an analysis of the interface impedance ($R_{SEI}$) and charge transfer impedance ($R_{ct}$) of the first and the second embodiment are presented using AC impedance in accordance with the present invention.

With reference to FIG. 5A and below chart 1, an analysis of the interface impedance ($R_{SEI}$) and charge transfer impedance ($R_{ct}$) of the first and the second embodiment are presented using AC impedance. In FIG. 5A, embodiment 1 and 2 as mentioned above are both have conductivity of lithium ions after 1 cycle of charging and discharging. The embodiment 2 shows the most promising result with only 5.34 $R_{SEI}$ and 65.96 $R_{ct}$ for having better conductivity of lithium ions.

CHART 1

| Sample | Impedance (Z)/Ohm | |
|---|---|---|
|  | $R_{SEI}$ | $R_{ct}$ |
| Control group (Bare-Cu) | 10.53 | 98.82 |
| Embodiment 1 | 11.81 | 71.17 |
| Embodiment 2 | 5.34 | 65.96 |

Figure 5B:
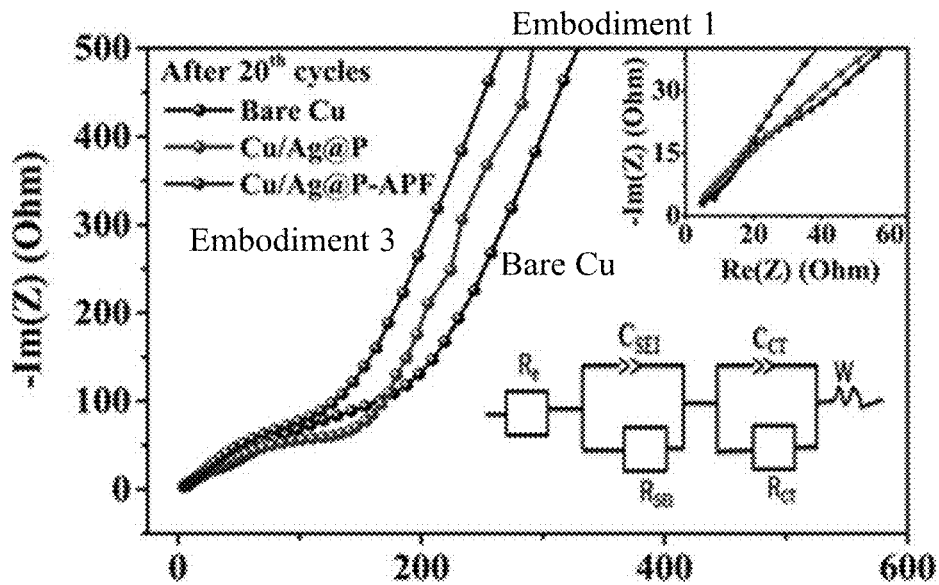
FIG. 5B is an analysis of the interface impedance ($R_{SEI}$) and charge transfer impedance ($R_{ct}$) of the first and the third embodiment are presented using AC impedance in accordance with the present invention.

With reference to FIG. 5B and below chart 2, in continuing for testing the interface impedance ($R_{SEI}$) and charge transfer impedance ($R_{ct}$) of the first and the third embodiment is also presented using AC impedance. In FIG. 5B, embodiment 1 and 3 as mentioned above are both have conductivity of lithium ions after 20 cycles of charging and discharging. The embodiment 3 in this validation shows the most promising result with only 14.56 $R_{SEI}$ and 117.68 $R_{ct}$ for having better conductivity of lithium ions.

CHART 2

| Sample | Impedance (Z)/Ohm | |
|---|---|---|
| | $R_{SEI}$ | $R_{ct}$ |
| Control group (Bare-Cu) | 38.27 | 188.31 |
| Embodiment 1 | 23.42 | 151.07 |
| Embodiment 3 | 14.56 | 117.68 |

In summary of the above analysis of the interface impedance ($R_{SEI}$) and charge transfer impedance ($R_{ct}$), in different cycles of charging and discharging for the full battery, the embodiments of the present invention with composite modified layer are all have more promising electrical performance like better Coulombic efficiency and higher capacity retention comparing to bare copper foil of the control group.

Figure 6A:
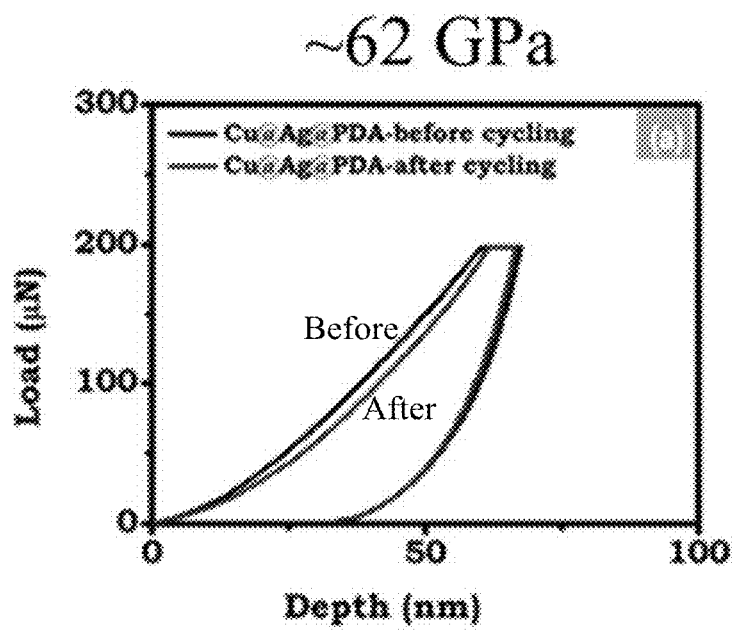
FIGS. 6A to 6C are Young's modulus analysis for the embodiments 1-3 in accordance with the present invention.
Figure 6B:
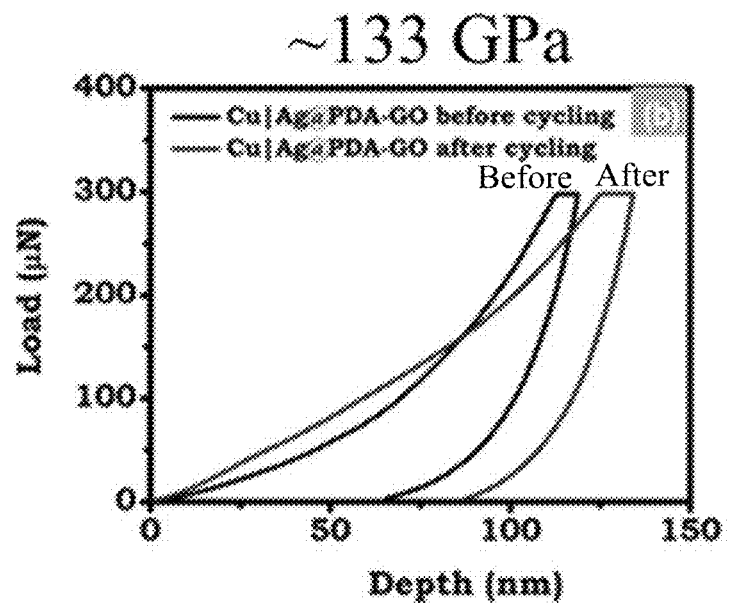
Figure 6C:
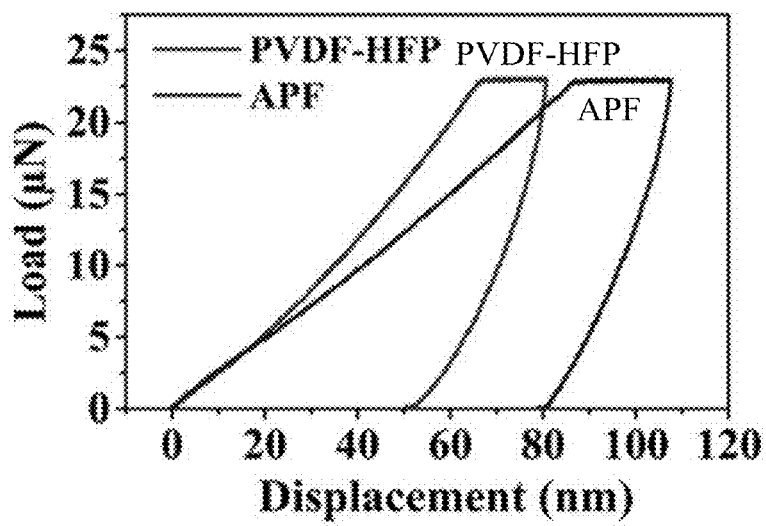

With reference to FIGS. 6A to 6C, a Young's modulus analysis for the embodiments 1-3 are presented. The Young's modulus of the embodiment 1 and 2 are 62 GPa and 133 GPa as shown in FIGS. 6A to 6C.

Figure 7A:
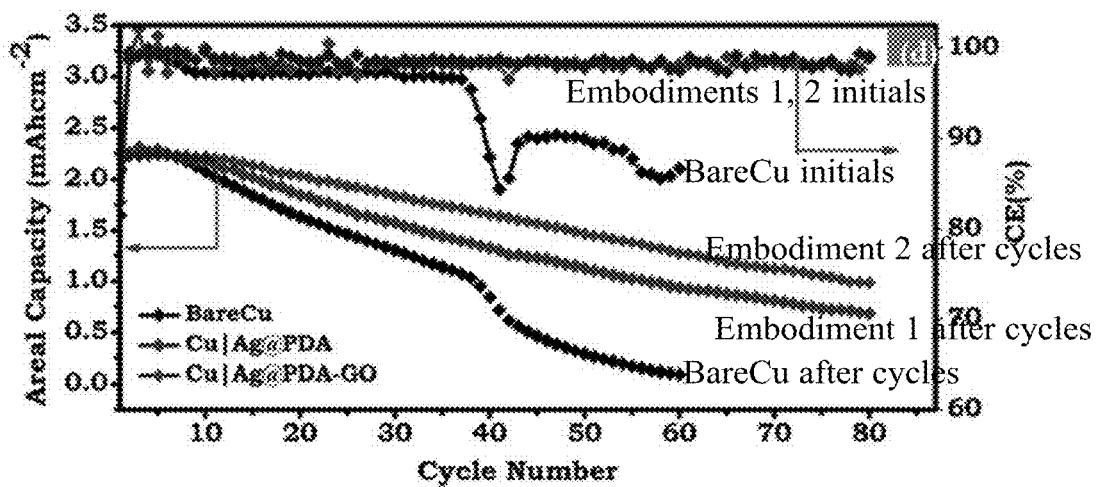
FIGS. 7A to 7B are electronical analysis for the embodiments 1-3 are presented by 60 cycles of charging and discharging in accordance with the present invention.
Figure 7B:
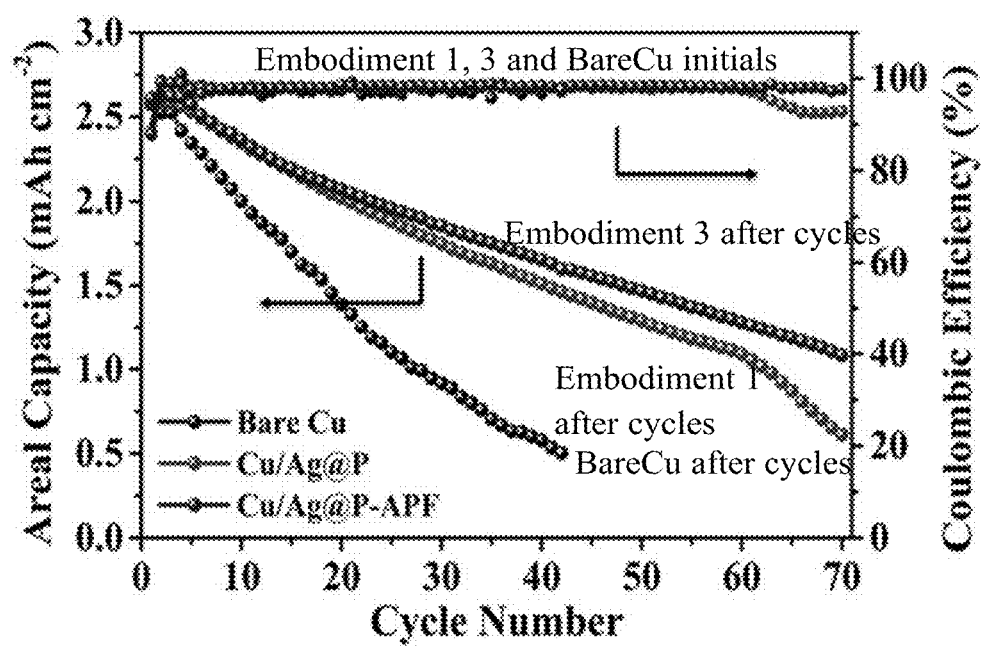

With reference to FIGS. 7A to 7B, the electronical analysis for the embodiments 1-3 are presented by 60 cycles of charging and discharging. In the result, all embodiments have qualified electronical performance. Embodiment 2 shows the most promising electronical performance with nearly 98.6% of Coulombic efficiency and nearly 55.7% of capacity retention. In the control group with bare copper foil, the Coulombic efficiency and the capacity retention are only near 87% and 4% which means that the present invention has the ability to optimize the efficiency of full lithium battery, especially to anode-free lithium battery.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. An anode-free lithium metal battery comprises:
   a current collector, wherein the current collector has a first surface and a second surface opposite the first surface; and
   a dual layer assembly attached to the first surface of the current collector,
   the dual layer assembly comprising:
   a composite modified layer directly attached to the first surface of the current collector, the composite modified layer comprising multiple silver nano-particles and a polydopamine layer, wherein the composite modified layer has a thickness in a range of 1-50 µm; and
   an artificial solid electrolyte interface attached on a surface of the polydopamine layer of the composite modified layer, wherein the artificial solid electrolyte interface is a graphene oxide layer.

2. The anode-free lithium metal battery as claimed in claim 1, wherein:
   the metal of the first surface of the current collector comprises one or a combination of Copper, Silver, Nickel, Platinum, Gold or stainless steel.

3. The anode-free lithium metal battery as claimed in claim 2, wherein the composite modified layer further comprises an artificial protective layer attached onto the surface of the polydopamine, wherein the artificial protective layer is a mixture or a composite of Polyvinylidene fluoride-hexafluoropropylene copolymer with lithium bis(trifluoromethanesulfonyl)imide.

4. The anode-free lithium metal battery as claimed in claim 3, wherein the mass ratio of Polyvinylidene fluoride-hexafluoropropylene copolymer with lithium bis(trifluoromethanesulfonyl)imide is at a range from 5:1 to 5:3.

* * * * *